June 5, 1928.
H. HORSFALL
SUPPORTING DEVICE
Filed Nov. 13, 1924    2 Sheets-Sheet 1
1,672,720
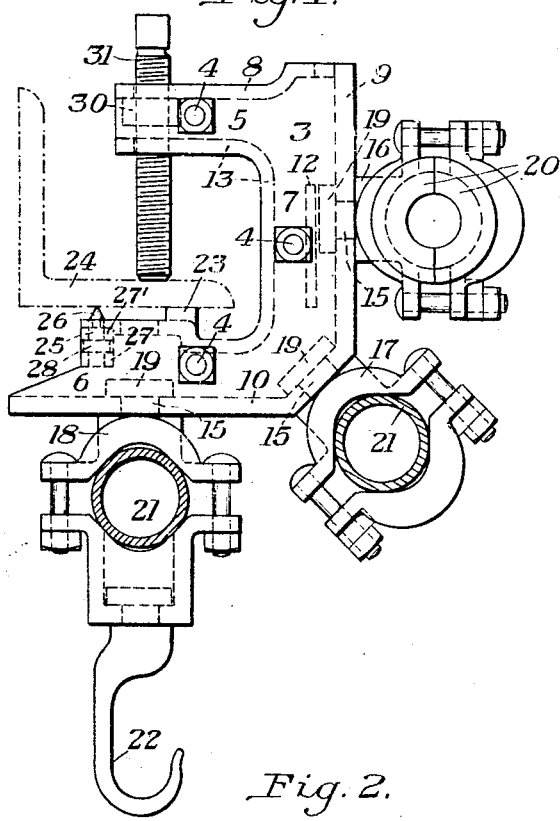
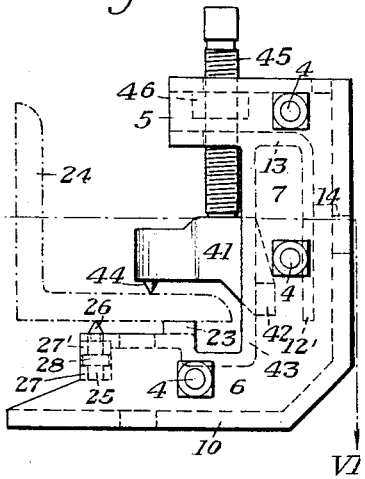
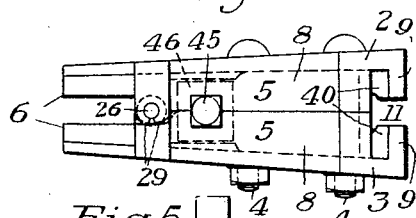
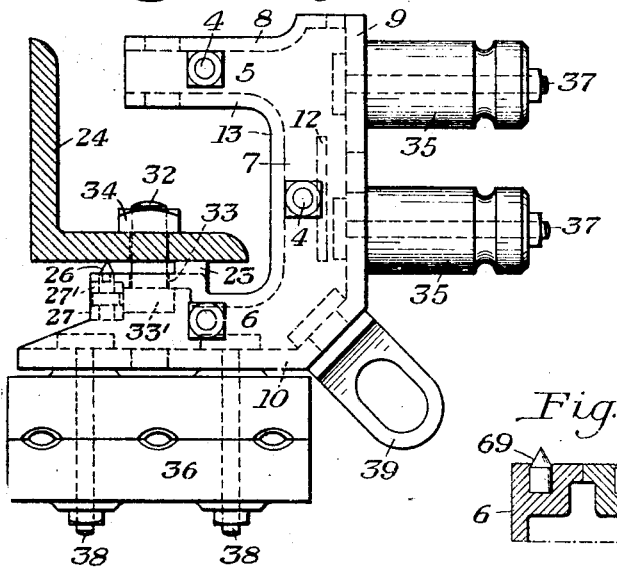
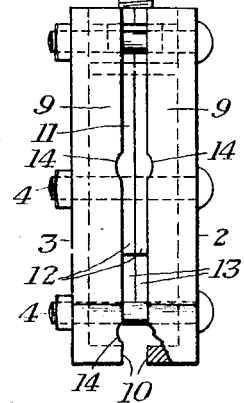
INVENTOR
Harold Horsfall
By Byrnes, Stebbins, Parmelee
his Attys June 5, 1928.
H. HORSFALL
SUPPORTING DEVICE
Filed Nov. 13, 1924　　2 Sheets-Sheet 2
1,672,720
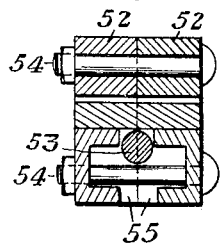
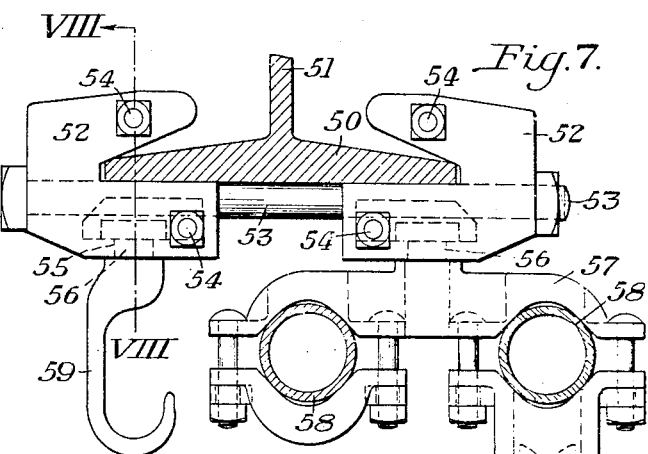
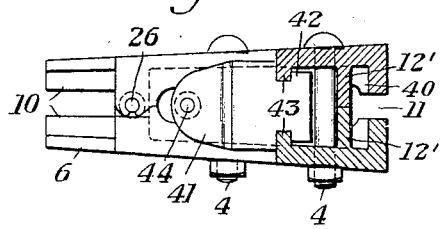
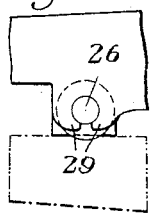
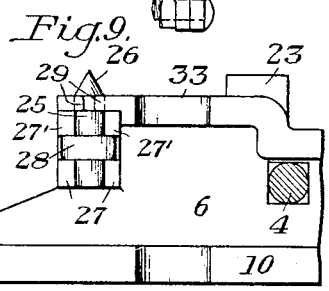
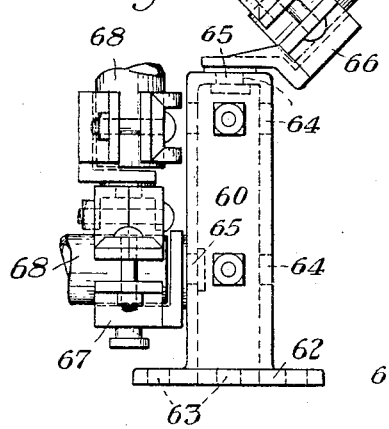
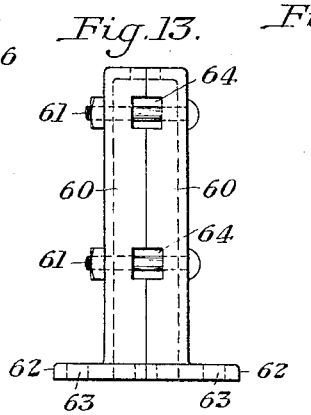
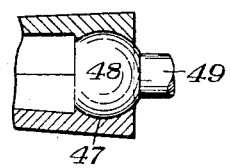
INVENTOR
Harold Horsfall
By Byrnes, Stebbins & Carmichael
His Attys Patented June 5, 1928.

1,672,720

UNITED STATES PATENT OFFICE.

HAROLD HORSFALL, OF JOHNSTOWN, PENNSYLVANIA.

SUPPORTING DEVICE.

Application filed November 13, 1924. Serial No. 749,634.

The present invention relates to supporting devices, and particularly to supporting devices adapted for use in conjunction with structural steel and iron work for the suspension of pipes, wires, cables and the like.

The purpose of the invention is to provide inexpensive supporting means of a universal nature which can be readily secured to the structural members of buildings, towers, bridges, floors, roofs and the like without necessitating any drilling or cutting of such members and which is adapted to hold different types of attachments at varying angles.

In the accompanying drawings, wherein are shown, for purposes of illustration only, certain preferred embodiments of my invention:

Figure 1 is a side elevation showing a supporting device embodying one form of my invention, with various fixtures attached, applied to a structural member by means of a set screw;

Figure 2 is a similar view showing the device secured to a structural member by means of a bolt and carrying different types of fixtures from those shown in Figure 1;

Figure 3 is an elevation of a modified form of supporting device utilizing a slidably adjustable clamping jaw in conjunction with a set screw;

Figure 4 is a top plan view of the supporting device shown in Figure 1 with the fixtures removed;

Figure 5 is an end elevation, partly broken away, of the device shown in Figure 3;

Figure 6 is a sectional plan view on the line VI—VI of Figure 3;

Figure 7 is a side elevation of another modified form of supporting device applied to the flange of a beam and carrying various fixtures;

Figure 8 is a sectional view on the line VIII—VIII of Figure 7 with the hook removed;

Figure 9 is a side elevation on a larger scale of the lower portion of one of the clamping sections illustrating the method of retaining the pin in the section;

Figure 10 is a top plan view of the pin setting shown in Figure 9;

Figure 11 illustrates a modified form of fixture post and a method of clamping the same in order to secure a universal movement of the post;

Figure 12 is a side elevation of a supporting device particularly adapted for supporting pipes;

Figure 13 is a rear elevation of the device shown in Figure 12 with the fixtures removed; and Figure 14 is a detail view showing a slight modification in one of the details of construction.

Referring to Figures 1, 4 and 5, the supporting device therein shown comprises two clamping sections 2 and 3 which are held in cooperative relation by bolts 4. Each of these clamping sections may be formed as a simple casting. When the sections are bolted together they form a substantially U shaped structure having upper and lower horizontal arms 5 and 6 connected by a vertical arm 7. Each clamping section comprises a U shaped plate having flanges at its edges forming a channel-like member. The flanges 8 at the upper side of the horizontal arm 5 are in abutting relation but the flanges 9 at the rear side of the vertical arm 7 and the flanges 10 at the lower side of the horizontal arm 6 do not abut, a slot 11 being left between these flanges when the sections are bolted together. If desired, the sections may have intermediate flanges 12 on their vertical arms which abut when the sections are bolted together, whereby a more rigid structure is provided. The flanges 13 at the lower side of the horizontal arm 5 and at the upper side of the horizontal arm 6 and at the forward side of the vertical arm 7 also are in abutting relation when the clamping sections are bolted together. In the edges of the flanges 9 and 10 are formed curved recesses 14 adapted to receive the cylindrical shanks 15 of various clamping fixtures 16, 17 and 18 as illustrated in Figure 1. These shanks have heads 19 formed at one end thereof whereby the fixtures are held in the supporting device between flanges 9 and 10 but may be permitted to revolve in the recesses 14. These fixtures are adapted to hold an insulating spool 20 for an electric cable or to hold pipes 21. One of the fixtures may have a hook 22 journaled therein for holding a chandelier if desired. However, it will be understood that the fixtures shown are merely illustrative and their particular construction is immaterial so far as the present invention is concerned.

The horizontal arm 6 of the supporting device has a pair of integral lugs 23 extending upwardly therefrom for engagement with the under side of a structural member such as the angle 24 shown in Figure 1. The arm also carries a steel pin 25 having a pointed upper end 26 for engagement with a structural member. This pin is held in one of the clamping sections in the manner illustrated in Figure 9. The section has two pairs of spaced lugs 27 and 27' between which the pin is journalled, the pin having an enlarged portion 28 positioned between the pairs of lugs 27 and 27'. The pin is held in position by peening the metal of the upper flange of the lower horizontal arm of the section about the pin as indicated at 29 in Figures 9 and 10.

In the construction shown in Figure 1 the upper horizontal arm 5 of the supporting device carries a nut 30 held in position between the sections and between the upper and lower flanges of the arm. This nut is engaged by a set screw 31 which is adapted to be screwed down into engagement with the structural member 24 as illustrated in Figure 1 for holding the supporting device in engagement with the structural member. The set screw is then clamped against turning, and at the same time is partially supported against bending by the flanges 8 and 13 adjoining each side of the nut and screw. This set screw cooperates with the lugs 23 and the pin 25.

Figure 2 illustrates a different method of securing the supporting device to the structural member. In this case the supporting device is held to the structural member by bolt 32 which extends through an opening 33 (Figure 9) formed in the flanges at the upper side of the horizontal arm 6. This bolt has a head 33' engaging these flanges and it extends through an opening in the structural member and is secured by a nut 34. Figure 2 also shows insulators 35 and 36 carried by the supporting device. The insulators 35 have bolts 37 extending through the same which are clamped in the space 11 between the flanges 9 of the vertical arm 7. The insulator 36 has bolts 38 which are clamped in the space 11 between the flanges 10 of the horizontal arm 6.

It will be noted that the corner of the supporting device where the horizontal arm 6 meets the vertical arm 7 is beveled as indicated whereby the fixture 17 shown in Figure 1 and the fixture 39 shown in Figure 2 stand at an angle of about 45° to the other fixtures carried by the arms 6 and 7. It will also be noted that the flanges 8 of the horizontal arm 5 are cut away adjacent the flanges 9 to provide a slot 40 to permit the heads 19 of the shanks 15 to pass when assembling the fixtures with the supporting device. In assembling the structure shown in Figure 1, for example, the clamping sections may be held loosely by the bolts 4 so as to permit the shanks 15 to slide through the channel 11 between the flanges 9 and 10 until such shanks arrive in the recesses 14. The nuts on the bolts 4 will then be tightened up and the fixtures will be clamped in position in said recesses but may be permitted to turn therein.

In the modified construction shown in Figures 3 and 6, a clamping jaw 41 is slidably associated with the vertical arm 7 of the supporting device. This clamping jaw has a T head 42 for engagement with the flanges 43 on the vertical arm 7 and it carries a pin 44 for engagement with the upper side of the structural member 24. A set screw 45 engaging a nut 46 cooperates with the sliding jaw. In this construction the upper horizontal arm 5 need not be so long as in the construction shown in Figure 1. Figures 3 and 6 show a slightly modified construction of intermediate ribs 12'.

Figure 11 shows a modification whereby the attachment fixtures may have a universal movement rather than a rotative movement around a single axis as in the construction shown in Figure 1. In this modified construction the flanges of the clamping sections may be thickened and provided with spherical recesses 47 in which the ball 48 of a fixture may be seated. With this construction the shank 49 may not only revolve about its own axis but may turn about different axes of the ball 48.

Figures 7 and 8 illustrate a modified form of my invention adapted for application to the flange 50 of a beam 51. In this form of the invention there are two clamping members 52 for engaging the opposite edges of the flange which are bolted together by a bolt 53. Each clamping member comprises two clamping sections similar to the clamping sections of the construction shown in Figure 1 and which are bolted together by transverse bolts 54. Each clamping member has an opening 55 in its flange to receive the shank 56 of a fixture. I have shown merely for the purpose of illustration a fixture clamp 57 adapted to hold pipes 58 and a hook 59 adapted to hold a chandelier, or other fixture.

In Figures 12 and 13 there is shown a supporting standard comprising two clamping sections 60 held together by transverse bolts 61. Each clamping section has a flange 62 at its lower end having openings 63 therein whereby the standard may be bolted to a support. This standard has openings 64 in its flanges adapted to receive the shanks 65 of fixtures 66 and 67 suitable for holding pipes 68 at different angles.

In Figure 14 there is shown a slight modification wherein steel pins 69 are set into the flanges at the upper side of the lower horizontal arm 6 of the supporting device of the type shown in Figure 1, 2 or 3.

These shanks take the place of the integral lugs 23.

It will be seen that in the various illustrated forms of my invention I have provided a simple supporting device made in two clamping halves which can be very cheaply constructed and which can be very quickly applied to use for holding various types of fixtures at various angles by first securing the sections together with the fixture or fixtures held therebetween and then securing the assembled device to a supporting element, such as the flange of a structural member.

While I have shown and described certain preferred embodiments of the invention it will be understood that the invention is not limited to these illustrated embodiments but may be otherwise embodied within the scope of the appending claims without departing from the spirit of the invention.

I claim:

1. A supporting device, comprising two clamping sections placed face to face against each other, means for detachably securing said sections together, and means for detachably securing the assembled device to a supporting member, said sections having cooperating flanges perpendicular to their opposed faces adapted to receive and hold between their edges the shanks of supporting fixtures, said edges having recesses therein forming seats for said shanks, substantially as described.

2. A substantially U shaped supporting device, comprising two U-shaped clamping sections, means for detachably securing said sections together, said sections having cooperating flanges thereon perpendicular thereto adapted to receive between their edges the shanks of supporting fixtures, one arm of said device being adapted to bear against a side of a supporting member, a nut carried by another arm of said device and held against turning between the sections of the device, and a set screw engaging said nut and adapted to engage the opposite side of said supporting member, substantially as described.

3. A substantially U shaped supporting device, comprising two clamping sections of substantially similar shape, means for detachably securing said sections together, said sections having cooperating flanges on their opposed faces adapted to receive between their edges the shanks of supporting fixtures, one arm of the assembled device having a pointed pin mounted therein for engagement with one side of a supporting member, and adjustable means carried by another arm of said device for engagement with the other side of said member, substantially as described.

4. A substantially U-shaped supporting device, comprising two clamping sections, each section being a single U-shaped piece, means for detachably securing said sections together, said sections having cooperating flanges projecting toward each other from the opposed faces thereof and adapted to receive between their edges the headed shanks of one or more supporting fixtures, one arm of said device being adapted to bear against a side of a supporting member, a nut carried by another arm of said device and held against turning between the sections of the device, and a set screw engaging said nut and adapted to engage the opposite side of said supporting member after the set screw is clamped against turning and held against bending by the edges of the cooperating flanges on each side of the nut, substantially as described.

5. A supporting device including a pair of opposed correspondingly positioned sections arranged face to face having cooperating flange portions projecting from the opposed faces thereof, said flange portions having opposed notches therein, a supporting pin passing between the flanges, said pin being received in the notches of said flanges, said pin having an enlarged inner end adapted to contact with an inner face of the flanges, means for detachably securing the sections together, and attaching means for the device.

In testimony whereof I have hereunto set my hand.

HAROLD HORSFALL.